US008510796B2

(12) United States Patent
Srivastava et al.

(10) Patent No.: US 8,510,796 B2
(45) Date of Patent: Aug. 13, 2013

(54) METHOD FOR APPLICATION-TO-APPLICATION AUTHENTICATION VIA DELEGATION

(75) Inventors: Alok Srivastava, Moraga, CA (US);
Rafiul Ahad, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1310 days.

(21) Appl. No.: 12/020,203

(22) Filed: Jan. 25, 2008

(65) Prior Publication Data

US 2009/0193499 A1  Jul. 30, 2009

(51) Int. Cl.
*G06F 7/04* (2006.01)

(52) U.S. Cl.
USPC .......... 726/2; 726/1; 726/17; 726/18; 726/19; 713/156; 713/2; 709/218; 705/78; 705/902

(58) Field of Classification Search
USPC ................ 726/2–6, 21; 713/168–172, 2, 164
See application file for complete search history.

(56) References Cited

U.S. PATENT DOCUMENTS

| 5,481,715 | A | * | 1/1996 | Hamilton et al. | 719/316 |
|---|---|---|---|---|---|
| 5,649,099 | A | * | 7/1997 | Theimer et al. | 726/4 |
| 6,044,466 | A | * | 3/2000 | Anand et al. | 726/1 |
| 6,122,741 | A | * | 9/2000 | Patterson et al. | 726/17 |
| 6,957,199 | B1 | * | 10/2005 | Fisher | 705/78 |
| 7,089,584 | B1 | * | 8/2006 | Sharma | 726/4 |
| 7,472,349 | B1 | * | 12/2008 | Srivastava et al. | 1/1 |
| 7,823,189 | B2 | * | 10/2010 | Patrick | 726/2 |
| 7,827,606 | B2 | * | 11/2010 | Rits et al. | 726/17 |
| 7,860,525 | B2 | * | 12/2010 | Parkkinen et al. | 455/518 |
| 7,913,301 | B2 | * | 3/2011 | Walker et al. | 726/18 |
| 8,402,556 | B2 | * | 3/2013 | Bradley | 726/30 |
| 2004/0088560 | A1 | * | 5/2004 | Danks | 713/200 |
| 2006/0045124 | A1 | * | 3/2006 | Dahlstrom et al. | 370/465 |
| 2006/0277591 | A1 | * | 12/2006 | Arnold et al. | 726/1 |
| 2008/0066159 | A1 | * | 3/2008 | Dillaway et al. | 726/4 |
| 2008/0104666 | A1 | * | 5/2008 | Dillaway | 726/2 |
| 2009/0119672 | A1 | * | 5/2009 | Bussard et al. | 718/104 |

OTHER PUBLICATIONS

Roy Campbell, Active capability, Feb. 16, 1996, Dept of Comp. Science, U of Illinois Urbana, pp. 1-6.*
Anu Gopalakrishnan, Cloud computing Identity Management, Nov. 2009, SET Labs Briefings (Infosys), pp. 45-54.*

* cited by examiner

*Primary Examiner* — Nathan Flynn
*Assistant Examiner* — Viral Lakhia
(74) *Attorney, Agent, or Firm* — Shun Yao; Park, Vaughan, Fleming & Dowler LLP

(57) ABSTRACT

Apparatus, methods, and computer program products are disclosed that present a delegated-right to a delegation system by a service-application provisioned with the delegation system. The delegated-right enables the service-application to perform an operation/access on behalf of a delegator-user. The method then attempts to perform the operation/access.

29 Claims, 5 Drawing Sheets

METHOD FOR APPLICATION-TO-APPLICATION AUTHENTICATION VIA DELEGATION

BACKGROUND

1. Technical Field

The disclosed technology relates to simplifying access control of a computerized application to control the data access and operations of a service-application executing in a computer system.

2. Background Art

Computer applications are sometimes used as tools to help provide services for users in a computer system. These user services require access to information, some of which may be private or otherwise be sensitive digitally-encoded information. The problem of providing secure and managed access to such information by any computer application is complex and difficult to manage. These difficulties increase as multiple computer applications (such as an application-tool-set) interact to provide the capability of the application-tool-set and increase even more when the applications are on different computers. The prior art has allowed access to the sensitive digitally-encoded information by a first application (for example a service-application) for a second application (a requesting application that can be local or remote) based on the security credential of the service-application. Once the service-application's security credential is authenticated the service-application receives a set of rights (System-Rights) that allows it to access the sensitive digitally-encoded information of any user in the system. This approach works where the sensitive digitally-encoded information is stored as system information and both the requesting application and the service-application are simply sharing the information without involvement of a user.

However, this prior art approach presents fundamental security, access, and regulatory problems because all the operations/accesses performed by the service-application happen under the assumption that the service-application will behave normally, will not perform any malicious activity, and that the requesting application does not exploit (intentionally or unintentionally) security flaws in the service-application. This assumption may be valid when both the requesting application and the service-application are trusted (for example, if both the requesting application and the service-application were developed by the same team/vender). However, this assumption is weakened when the applications were separately developed, provided by different vendors, or deployed with different companies. Yet these applications must interact because of business needs.

Because the System-Rights provide the service-application with access to information from all users the sensitive digitally-encoded information of different users is not protected by the System-Rights. Nevertheless, it is important that the administrator of the service-application be able to prevent the service-application from operating on or accessing user information if the user who has invoked the requesting application (that then invoked the service-application) does not have rights to that information. However, the fine-grained administration of the Access Control Polices or Role Based Permissions required to appropriately protect each user's information is difficult and error-prone.

FIG. 1 illustrates a prior-art server system architecture 100 that demonstrates the prior-art approach. The prior-art server system architecture 100 includes a data storage 101 that contains data from or about multiple users. A user can login to the prior-art server system architecture 100 through a user login module 103 that assigns user-Rights to the user. The assigned user-Rights can enable the use of delegated-rights that can be managed by a delegation system module 105. The assigned user-Rights and the user access policy module 107 determine a limited access path 109 for the user to access the data storage 101 through an exposed data realm 111. Once the user has user-Rights, the user can invoke a user application module 114 as the requesting application.

In the case where the user application module 114 executes on a client computer networked to a server computer and requests service from the prior-art server system architecture 100, the user application module 114 on the client computer (not shown) can connect via a remote service provider access module 113 (for example by connecting using a specified port) to a server computer that transports data between the user application module 114 and a service-application 115 that has System-Rights. In the case where the user application module 114 executes on the same computer as the service-application 115 can also interact using the remote service provider access module 113 or by any appropriate inter-process communication facility supported by the server computer.

The service-application 115 then uses its System-Rights and a system access policy module 117 to access the data storage 101 as indicated by an unconstrained access path 119. Regardless of which user is being serviced, the service-application 115 has access any user's information on the data storage 101. Thus, a programming error or malicious code in the service-application 115 could access and/or modify other user information on the data storage 101. In addition, a programming error or malicious code in the user application module 114 or the remote application accessing the service-application 115 through the remote service provider access module 113 could exploit vulnerabilities in the service-application 115 to operate on or access any user's information.

Application authentication is well understood by one skilled in the art and there exist many techniques to authenticate an application. However, these known techniques do not support access rights and models resulting from stringent regulatory requirements.

There has been a long-felt, but unsatisfied need to provide a better way for administrating rights for applications that interact with other applications. Some of these long-felt needs include: 1) because the service-application that operates on sensitive digitally-encoded information is provided System-Rights that allow unfettered access to, and operations on the user data (including the sensitive digitally-encoded information) for all users. A need exists to limit the service-application's access to user data; 2) administrators of the service-application need easy-to-use, fine-grained user- or group-based control of the service-application's Rights to simply control the service-application's access to each user's information; 3) there is a need to protect user data from programming errors in the service-application and to prevent improper data access or operations resulting from accidental or intentional programming that misuses user data. 4) there is a need to protect the user data from attempts of the requesting application to exploit the service-application with the intent to improperly obtain user data or perform malicious acts; and 5) there is a need for an audit trail to capture the activity that has taken place on a user's behalf.

It would be advantageous to develop a technology that addresses the previously discussed issues.

DETAILED DESCRIPTION

One aspect of the technology disclosed herein is a method that presents a delegated-right to a delegation system by a service-application provisioned with the delegation system. The delegated-right enables the service-application to perform an operation/access on behalf of a delegator-user. The method then attempts to perform the operation/access.

One skilled in the art will understand from the method how to cause a computer to perform the method and how to manufacture a program product that, when executed by a computer, will cause the computer to perform the method.

Figure 1:
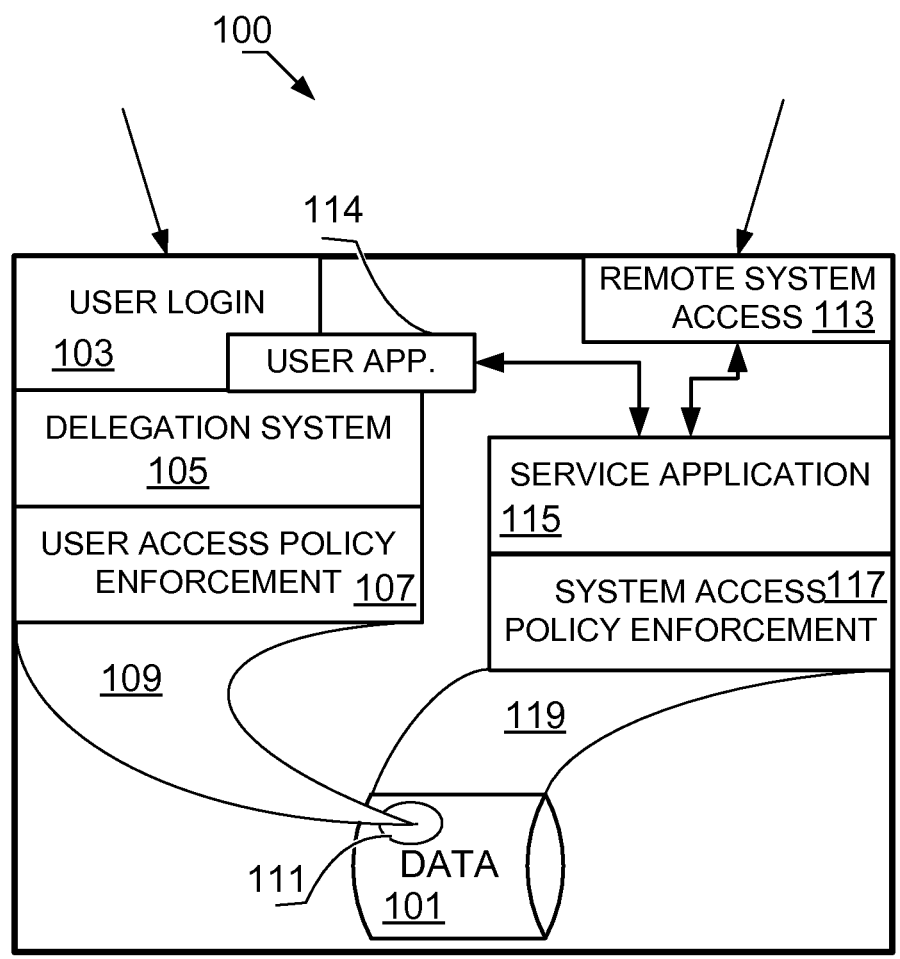
FIG. 1 illustrates a prior-art server system architecture.
Figure 2:
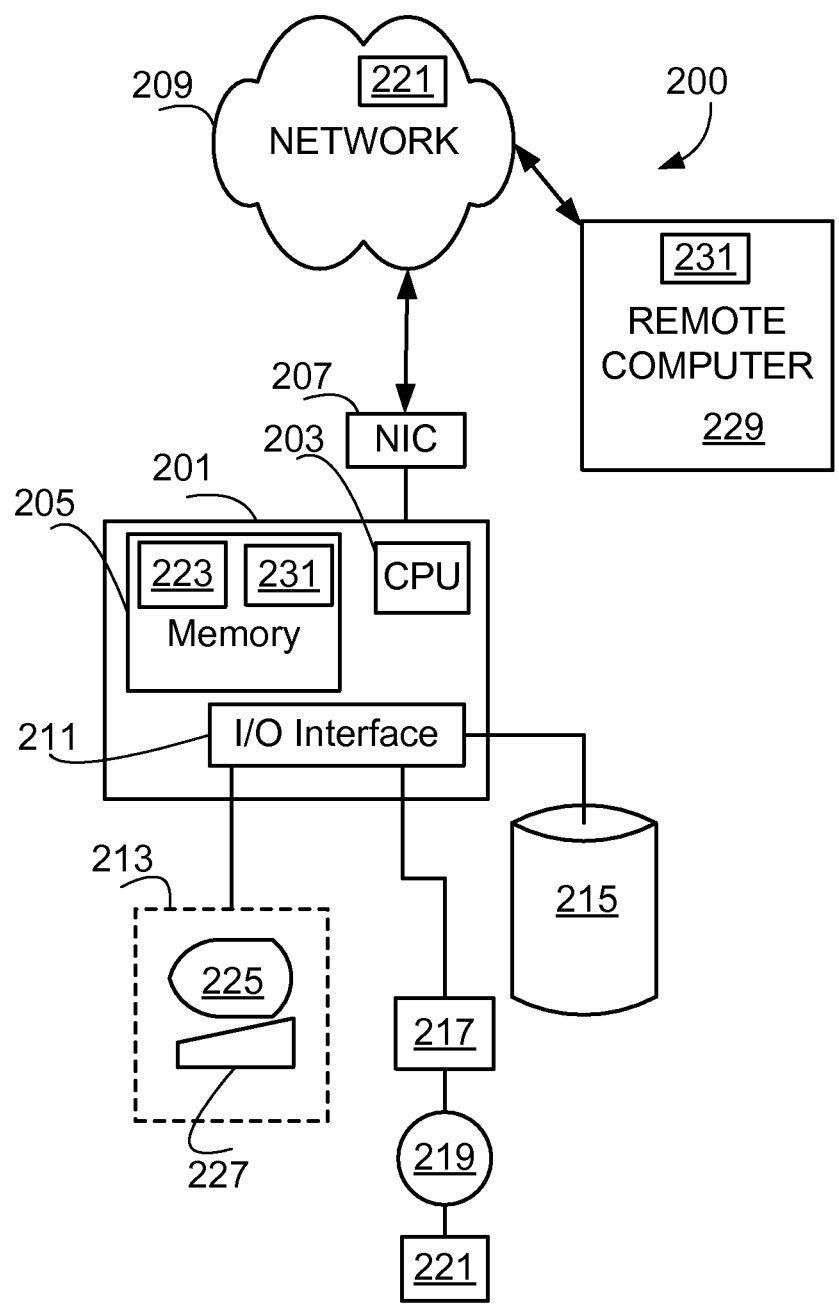
FIG. 2 illustrates a networked computer system that can use the technology disclosed herein.

FIG. 2 illustrates a networked computer system 200 that can incorporate an embodiment of the disclosed technology. The networked computer system 200 includes a computer 201 that incorporates a CPU 203, a memory 205, and a network interface 207. The network interface 207 provides the computer 201 with access to a network 209. The computer 201 also includes an I/O interface 211 that can be connected to a user interface device(s) 213, a storage system 215, and a removable data device 217. The removable data device 217 can read a computer-usable data carrier 219 (such as a fixed or replaceable ROM within the removable data device 217 itself (not shown); as well as a computer-usable data carrier that can be inserted into the removable data device 217 itself (such as a memory stick, CD, floppy, DVD or any other tangible media) that typically contains a program product 221. The user interface device(s) 213 can include a display device 225 and a user input device 227. The storage system 215 (along with the removable data device 217), the computer-usable data carrier 219, and (in some cases the network 209) comprise a file storage mechanism. The program product 221 on the computer-usable data carrier 219 is generally read into the memory 205 as a service-application 223 which instructs the CPU 203 to perform specified operations. In addition, the program product 221 can be provided from devices accessed using the network 209. The network 209 can also connect to a remote networked device 229 that can execute a requesting program 231 that interacts over the network 209 with the service-application 223. The requesting program 231 can also reside in the memory 205 of the computer 201 and interact with the service-application 223 using inter-process communication facilities provided by the operating system in the computer 201.

One skilled in the art will understand that the network propagates information (such as data that defines a computer program). Signals can be propagated using electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 209. Thus, the network 209, like a tangible physical media, can be a computer-usable data carrier. One skilled in the art will understand that not all of the displayed features of the computer 201 need to be present for all embodiments that implement the techniques disclosed herein. Further, one skilled in the art will understand that computers are ubiquitous within modern devices ranging, for example, from cell phones to vehicles to kitchen appliances etc.

One skilled in the art will understand authentication and authorization terminology such as "principal", "privilege", "access type", "role", "policy statement", "access control entry (ACE)", "access-control-list (ACL)", etc. and equivalents as understood by one skilled in the art.

Rights include both Privileges and Access Types. Access to an entity such as a data file, programmed service (such as generation of an HTML document for transmission over a network, etc.) is controlled via the Access Types. Operations on an entity are allowed through Privileges. Herein the term "operate/access" and its variants encompass both 1) accesses via Access Types 2) Operations via Privileges.

It is known in the art how to enable a delegator-user to delegate rights to a delegatee-user such that the delegatee-user can perform some operations/accesses on behalf of the delegator-user. These techniques provide fine grain control over the delegated-rights and also generally provide audit capabilities to verify that the delegatee-user did or did not perform one of the delegated operations/accesses.

The inventors have discovered that the rights administration used for user delegation can also be used to address the security needs of the application-tool-set. To do so, the service-application is provisioned as an application-user with a set of service-rights that allow the service-application to access and activate the delegated-rights it has received. An administrator for (or user of) the application-tool-set creates a delegated-right representing the delegator-user with sufficient rights to allow the service-application to access the delegator-user's information and/or perform an operation/access on behalf of the delegator-user. The delegated-right is added to a set of delegated-rights available to the service-application. This is analogous to an executive delegating, to an assistant, limited rights to his/her electronic-mail and thereby to allow the assistant to act on the executive's behalf (the assistant can perform the operation in lieu of the executive).

Figure 3:
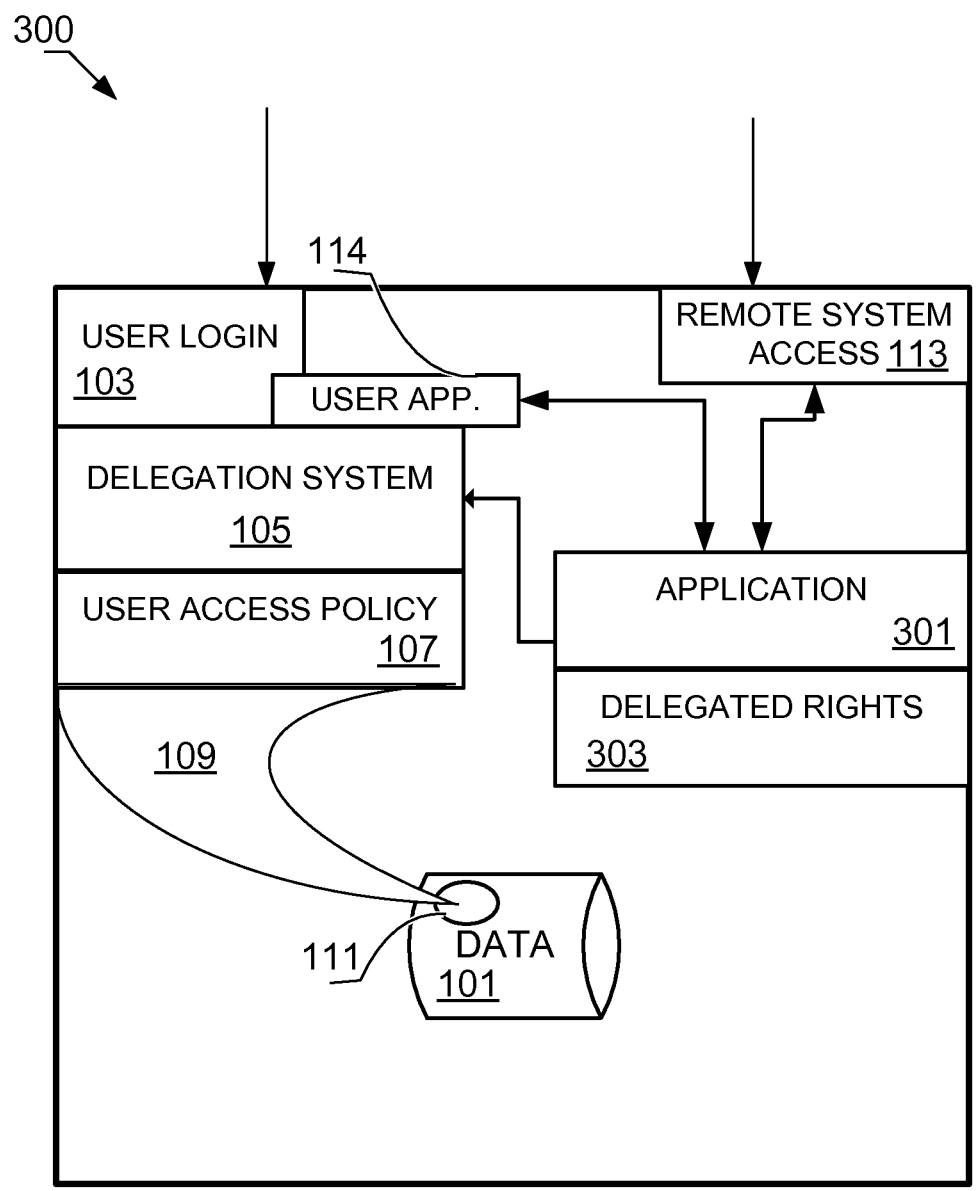
FIG. 3 illustrates an improved service system architecture.

FIG. 3 illustrates an improved service system architecture 300 that can include the data storage 101, the user login module 103, the delegation system module 105, the user access policy module 107, the limited access path 109, the exposed data realm 111, the remote service provider access module 113, and the user application module 114 as previously described. However, the improved service system architecture 300 additionally includes an improved service-application 301 that is a version of the service-application 115 that incorporates the technology described herein. The improved service system architecture 300 also includes a delegated Rights storage 303.

With the improved service system architecture 300, the requesting application can communicate with the improved service-application 301 in the same manner as with the service-application 115 in the prior art. However, the improved service-application 301 (operating as an application-user having limited service-rights as is subsequently described with respect to FIG. 4 and FIG. 5) determines the user of the requesting application that has instigated the requested operation/access, accesses the delegated Rights storage 303, verifies that the user is a delegator-user, retrieves a delegated-right for that delegator-user, activates the delegated-right (thus changing from an application-user to a delegatee of the delegator-user and in some embodiments losing access to the delegated Rights storage 303 provided by the service-rights), and operates on or accesses the data storage 101 on behalf of the delegator-user through the limited access path 109 subject to the delegated-right of the delegator-user as is subsequently described for one embodiment with respect to FIG. 4). Because the limited access path 109 is used, (thus limiting the operate/access to the exposed data realm 111) instead of the unconstrained access path 119 the improved service-application 301 cannot access other user's information and thus the improved service-application 301 is more secure than the service-application 115.

In some embodiments, the delegated-right is represented by a delegated-to principal against which the user access policy module 107 evaluates the attempted operation/access and the service-right is represented by a provisioning principal. The delegated-to principal can be made available to the improved service-application 301 as one of its set of delegated-to principals that can be stored in the delegated Rights storage 303. The following describes such an embodiment. One skilled in the art will understand that the technology as claimed covers other known delegation techniques.

In most embodiments, only one principal can be active at a time. Thus, when a second principal is activated, the first principal is automatically deactivated. Some systems may require an explicit deactivation of the first principal prior to activation of the second principal. However, such systems tend to be more open to programming errors and malicious exploits. Nevertheless, such systems are also contemplated by the inventors.

After the improved service-application 301 is invoked, it eventually receives a request to perform an operation/access on/of the user information. The user information can include sensitive digitally-encoded information. The improved service-application 301 activates the delegated-to principal provided by the delegator-user (or on the delegator-user's behalf), and attempts to perform the requested operation/access on behalf of the delegator-user. The improved service-application 301 generally does not need the delegator-user's password or other credential because the delegator-user (or an administrator) identified the improved service-application 301 as his/her delegatee (in this embodiment by creating the delegated-to principal and providing it to the improved service-application 301 via the delegated Rights storage 303).

The operations/accesses attempted by the improved service-application 301 on behalf of the delegator-user are authorized with respect to the delegated-to principal. These attempted operations/accesses can be recorded and/or tracked (for example by, the delegation system module 105, rights managements system, etc.) as attempted by the improved service-application 301 on behalf of the delegator-user. In addition the results of the attempted operation/access can also be recorded to track allowed and denied attempts.

If the improved service-application 301 should attempt some unauthorized operation/access (an out-of-right operate/access whether by malicious or erroneous code in either the improved service-application 301 or the requesting application), the operation/access will be rejected and the improved service-application 301 will be subject to an "access denied exception" or the like and will not be able to access the delegator-user's sensitive digitally-encoded information or perform the requested operation/access on behalf of the delegator-user.

When the operation/access completes, the improved service-application 301 can reactivate its service-right to regain access to the delegated Rights storage 303 and await the next operation/access request.

When the application-user receives the next operation/access request it activates the delegated-to principal for that user (and in some embodiments the user-operation/access combination) from its set of delegated-to principals and performs the operation/access as above.

Figure 4:
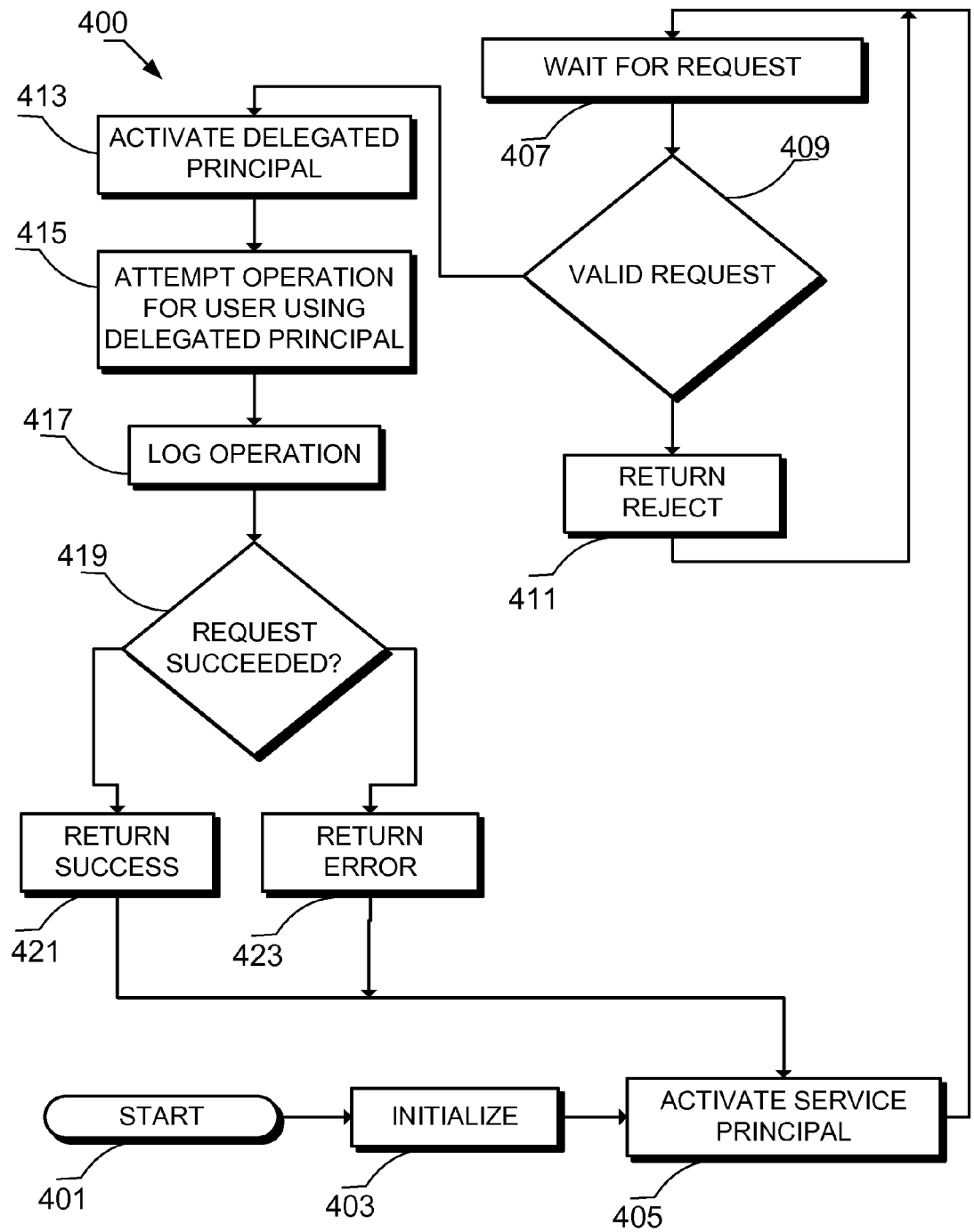
FIG. 4 illustrates a service process.

FIG. 4 illustrates a service process 400 that can be used to implement the technology disclosed herein. The service process 400 can be initiated at a start terminal 401 by any technology known in the art such (as in response to the server system booting, in response to an administrator command, in response to an event, etc.). Once initiated, the service process 400 continues to an 'initialization' procedure 403 that performs any required initialization. Once initialized, the service process 400 continues to an 'activate provisioning principal' procedure 405 that activates the provisioning principal created when the improved service-application 301 was provisioned (as is subsequently described with respect to FIG. 5). Activating the provisioning principal enables the improved service-application 301 to access the delegated Rights storage 303. The service process 400 continues to a 'wait for request' procedure 407 that waits for a request from any requesting application. Once such a request is received, the service process 400 continues to a 'validate request' decision procedure 409 that verifies that the request is, for example, well formatted, a supported request, identifies a delegator-user, and verifies that the delegated Rights storage 303 contains a delegated-to principal for the delegator-user for the requested operation/access (some embodiments can also check to determine whether the operation/access is valid for the specified delegator-user). If the request is flawed, the service process 400 continues to a 'return rejected request' procedure 411 that can return a status to the requesting application indicating that request was rejected.

However, if the request is valid, the service process 400 continues to an 'activate delegated-to principal' procedure 413 that obtains the delegated-to principal from the delegated Rights storage 303 that matches the delegator-user (the delegated-to principal obtained from the delegated Rights storage 303 can also be responsive to the requested operation/access), and once obtained activates that delegated-to principal (thus becoming no longer able to access the delegated Rights storage 303). Once the delegated-to principal is activated an 'attempt operation' procedure 415 attempts the requested operation/access (which can access the data storage 101 through the limited access path 109 such that only the exposed data realm 111 is subject to the operation/access). A 'log operation' procedure 417 can record that the request was attempted by the improved service-application 301 on behalf of the delegator-user; and whether the attempt was successful or not. A 'request successful' decision procedure 419 determines whether the operation succeeded or failed. If successful, a 'return success' procedure 421 returns a success response to the requesting application and the service process 400, continues to the 'activate provisioning principal' procedure 405 that can activate the system-user Right to again allow the improved service-application 301 access to the delegated Rights storage 303 and waits at the 'wait for request' procedure 407 for the next request. If the 'request successful' decision procedure 419 determines that the request was unsuccessful (for example, if the request was authorized by the delegated-to principal and thus out-of-right), the service process 400 continues to a 'return error' procedure 423 that returns an appropriate error response; and the service process 400 continues to the 'activate provisioning principal' procedure 405 for processing as previously discussed.

After the service-application is provisioned it can identify itself as an application-user by activating the provisioning principal provided when the service-application was provisioned. This "login" can be initiated responsive to initialization of the service-application, when the server that serves as a host to the provisioning principal is booted, or by the use of any other activation technology. When the service-application has activated the provisioning principal, it has access to the delegated Rights storage 303 and thus can retrieve and activate a delegated-to principal. After the requested operation/access is attempted under the delegated-to principal, the service-application can reactivate its provisioning principal to regain access to the delegated Rights storage 303.

Figure 5:
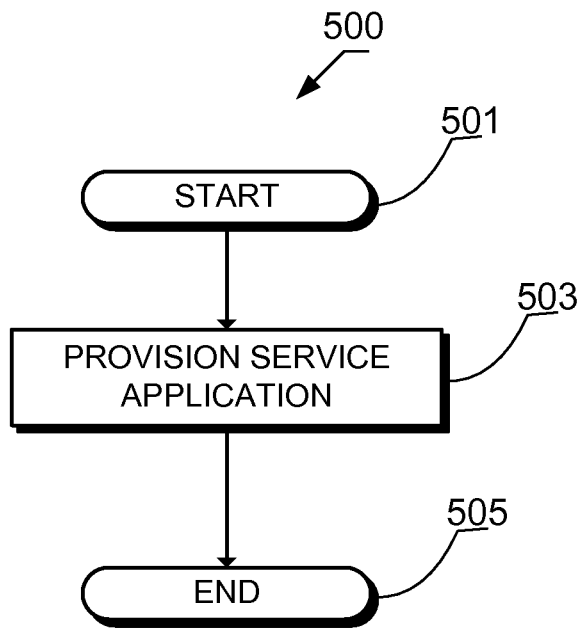
FIG. 5 illustrates a provisioning process.

FIG. 5 illustrates a provisioning process 500 that can include a start terminal 501, a 'provision service-application with provisioning principal' procedure 503, and an end terminal 505. The 'provision service-application with provisioning principal' procedure 503 generates a provisioning principal (or other service-right). The provisioning principal generally has a limited set of Rights that comprise at least Rights to access the delegated Rights storage 303 and the delegation system module 105 so as to enable performance of the operations previously described with respect to FIG. 3. One skilled in the art will understand how to specify and create the service-right.

Figure 6:
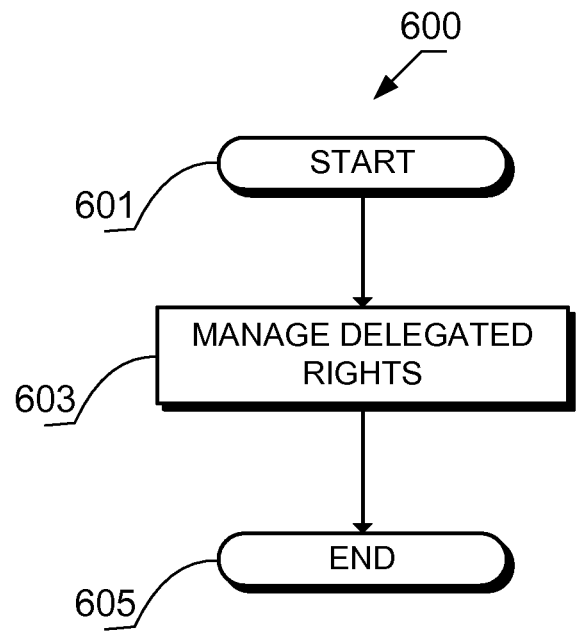
FIG. 6 illustrates a rights modification process.

FIG. 6 illustrates an rights modification process 600 that can include a start terminal 601, a 'modify rights' procedure 603, and an end terminal 605. The 'modify rights' procedure 603 provides the administrator (and in some embodiments, the user) of the service-application with the ability to expand or contract the scope of the Rights delegated to the service-application by editing, deleting, or otherwise manipulating the delegated-right of a particular delegator-user. In addition the administrator of the service-application can generate delegated-rights for Roles, Groups, and the like and delegate these Role, Group, etc. rights to the service-application.

To disable the service-application from performing the operation/access on behalf of a delegator-user, the administrator or the delegator-user can remove, delete, disable, edit, or otherwise manipulate the delegator-user's delegated-right in the set of delegated-rights available to the service-application (for example, those that reside in the delegated Rights storage 303).

To modify the rights available to the service-application related to the delegator-user, some embodiments allow modification of the delegated-to principal by the administrator or the delegator-user. Some embodiments require that the previously provided delegated-to principal be deleted and replaced by a new delegated-to principal for that delegator-user.

To completely disable the service-application, the administrator can disable the service-right created when the service-application was provisioned.

An administrator or delegator-user of the service-application can create one or more additional principals representing the delegator-user for other operations/accesses on the same data realm, or for the same operations/accesses on a different data realm. Such principals can be delegated to the service-application to allow the service-application to perform operations/accesses in accordance with a second set of Rights associated with those operations/accesses and the delegator-user.

The technology disclosed herein is applicable to, for example but without limitation, collaboration systems, messaging systems, content management systems and the like.

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, such a one will understand that such logics includes an access logic, an audit logic, a configuration logic, a delegator logic, a deny operation logic, a disablement logic, a principal modification logic, a principal access logic, a principal delegation logic, a principal generation logic, a presentation logic, a rights evaluation logic, etc.

One skilled in the art will understand that the network carries information (such as informational data as well as data that defines a computer program). The information can also be propagated using a carrier-wave. Signals capable of propagating the information includes electromagnetic signals, visible or invisible light pulses, signals on a data bus, or signals propagated over any wire, wireless, or optical fiber technology that allows information to be transmitted over a network. Programs and data are commonly read from both tangible physical media (such as a compact, floppy, or magnetic disk) and from a network. Thus, the network, like a tangible physical media, can be a computer-usable data carrier.

One skilled in the art will understand that the term "presenting" includes operations such as, but not limited to: passing an argument containing information to a programmed procedure using a subroutine, function, or method call, storing information in a file or database record for retrieval by a program or programmed procedure, passing the information over a network, passing the information over a pipe, etc.

From the foregoing, it will be appreciated that the disclosed technology has (without limitation) the following advantages:

1) it provides additional security for service-applications that access user information;
2) it provides delegation capability for a user to delegate operations/accesses to a service-application such that the service-application can access the user's information without being able to access other user's information;
3) it provides administrators of the service-application with easy-to-use, fine-grained user- or group-based control of the service-application's Rights to control the service-application's access to each user's information;
4) it provides administrators of the service-application with the ability to define policies for the service-application the same way the define policies for user access to limit what the service-application can do within the system, what data it can or cannot access and what actions it can perform.
5) it allows administrators to provide access additional service-applications without increasing their concerns relating to information/data piracy.
6) it encourages data sharing thus allowing corporate information to reach wider audience without compromising security or taking risk with sensitive digitally-encoded information.
7) it allows administrators to increase automation of application-tool-sets because it satisfies heightened compliance requirements with regard to protection of user information and auditing access and operations using the user information.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A computer controlled method for delegation-based application-to-application access control, the method comprising:
   receiving, by a service application on a computer, an operation request, from a requesting application;
   identifying a user of the requesting application based on the operation request, wherein identifying the user involves determining that the operation request is valid for the identified user, and wherein the identified user is a principal of the operation;
   gaining access to a delegated-rights repository that stores a set of delegated rights, wherein a respective delegated right specifies access-control rights delegated to the service application by an associated user;
   retrieving a delegated right specific to the identified user from the delegated-rights repository;
   activating the retrieved delegated right, wherein activating the retrieved delegated right involves accessing, by the service application, a delegated-to principle representing the retrieved delegated right; and
   allowing the service application to perform the operation on behalf of the identified user based on the retrieved delegated right.

2. The computer controlled method of claim 1, further comprising:
   generating a delegated-to principal representing a right of the identified user to perform the operation; and
   providing said delegated-to principal to said service application.

3. The computer controlled method of claim 1, further comprising removing said delegated-to principal from a set of delegated-to principals.

4. The computer controlled method of claim 1, further comprising modifying said delegated-to principal.

5. The computer controlled method of claim 1, further comprising accessing, by said service application, a second delegated-to principal from said set of delegated-to principals.

6. The computer controlled method of claim 5, wherein said second delegated-to principal represents a delegated right of a second user to perform said operation.

7. The computer controlled method of claim 5, wherein said second delegated-to principal represents a second delegated right of said user to perform a second operation.

8. The computer controlled method of claim 1, further comprising performing said operation responsive to said service application and recording said operation as performed on behalf of said identified user.

9. The computer controlled method of claim 1, further comprising:
   detecting that said operation is an out-of-right operation;
   denying said operation; and
   recording that said out-of-right operation was attempted by said service application on behalf of said user.

10. The computer controlled method of claim 1, wherein said identified user is an individual user, a group, an enterprise, or a role.

11. The computer controlled method of claim 1, wherein activating the retrieved delegated right further involves precluding the service application from retrieving a different delegated right than the delegated right specific to the identified user.

12. An apparatus for delegation-based application-to-application access control, comprising:
   a processor;
   a delegated-rights repository configured to store a set of delegated rights, wherein a respective delegated right specifies access-control rights delegated to the service application by an associated user;
   a service application logic; and
   a provisioning logic;
   wherein the provisioning logic is configured to provision the service application with a service right to access the delegated-rights repository; and
   wherein the service application logic is configured to:
      receive an operation request from a requesting application;
      identify a user of the requesting application based on the operation request, wherein identifying the user involves determining that the operation request is valid for the identified user, and wherein the identified user is a principal of the operation;
      retrieve a delegated right specific to the identified user from the delegated-rights repository;
   activate the retrieved delegated right, wherein activating the retrieved delegated right involves accessing, by the service application, a delegated-to principle representing the retrieved delegated right; and
      perform the operation of behalf of the user based on the retrieved delegated right.

13. The apparatus of claim 12, further comprising:
   a rights evaluation logic configured to detect that said operation is an out-of-right operation and to deny said operation; and
   an audit logic, responsive to the rights evaluation logic, configured to record that said out-of-right operation was attempted by said service application on behalf of said identified user.

14. The apparatus of claim 12, wherein said identified user is a individual user, a group, an enterprise, or a role.

15. The apparatus of claim 12, further comprising:
   a principal generation logic configured to generate a delegated-to principal representing a right of said identified user to perform said operation; and
   a principal delegation logic configured to provide said delegated-to principal to the service application logic.

16. The apparatus of claim 15, further comprising a principal modification logic configured to modify said delegated-to principal.

17. The apparatus of claim 12, wherein the service-application logic is also configured to access a second delegated-to principal from a set of delegated-to principals.

18. The apparatus of claim 17, wherein said second delegated-to principal represents a delegated right of a second delegator-user to perform said operation.

19. The apparatus of claim 17, wherein said second delegated-to principal represents a second delegated right of said user to perform a second operation.

20. The apparatus of claim 12, wherein the access logic further comprises an audit logic configured to record said operation as performed on behalf of said identified user.

21. The apparatus of claim 12, wherein while activating the retrieved delegated right, the service-application logic is precluded from retrieving a different delegated right than the delegated right specific to the identified user.

22. A computer program product comprising:
a non-transitory computer-usable data carrier providing instructions that, when executed by a computer, cause said computer to perform a method for delegation-based application-to-application access control, the method comprising:
receiving, by a service application on a computer, an operation request, from a requesting application;
identifying a user of the requesting application based on the operation request, wherein identifying the user involves determining that the operation request is valid for the identified user, and wherein the identified user is a principal of the operation;
gaining access to a delegated-rights repository that stores a set of delegated rights, wherein a respective delegated right specifics access-control rights delegated to the service application by an associated user;
retrieving a delegated right specific to the identified user from the delegated-right repository;
activating the retrieved delegated right, wherein activating the retrieved delegated right involves accessing, by the service application, a delegated-to principle representing the retrieved delegated right; and
allowing the service application to perform the operation on behalf of the identified user based on the retrieved delegated right.

23. The computer program product of claim 22, wherein method further comprises:
generating a delegated-to principal representing a right of said identified user to perform said operation; and
providing said delegated-to principal to said service application.

24. The computer program product of claim 22, wherein said identified user is a user, a group, an enterprise, or a role.

25. The computer program product of claim 22, wherein activating the retrieved delegated right further involves precluding the service application from retrieving a different delegated right than the delegated right specific to the identified user.

26. The computer program product of claim 22, further comprising accessing, by said service-application, a second delegated-to principal from a set of delegated-to principals.

27. The computer program product of claim 26, wherein said second delegated-to principal represents a delegated-right of a second delegator-user to perform said operation.

28. The computer program product of claim 26, wherein said second delegated-to principal represents a second delegated right of said user to perform a second operation.

29. The computer program product of claim 22, wherein the method further comprises:
detecting that said operation is an out-of-right operation;
denying said operation; and
recording that said out-of-right operation was attempted by said service application on behalf of said user.

* * * * *

UNITED STATES PATENT AND TRADEMARK OFFICE
CERTIFICATE OF CORRECTION

PATENT NO. : 8,510,796 B2
APPLICATION NO. : 12/020203
DATED : August 13, 2013
INVENTOR(S) : Srivastava et al.

It is certified that error appears in the above-identified patent and that said Letters Patent is hereby corrected as shown below:

In the Specifications

In column 4, line 64, delete "delagatee" and insert -- delegatee --, therefor.

In the Claims

In column 9, line 31, in Claim 1, delete "specifics" and insert -- specifies --, therefor.

In column 10, line 20, in Claim 12, delete "specifics" and insert -- specifies --, therefor.

In column 10, line 41, in Claim 12, delete "of behalf" and insert -- on behalf --, therefor.

In column 10, line 52, in Claim 14, delete "a individual" and insert -- an individual --, therefor.

In column 10, line 66-67, in Claim 18, delete "second delegator-user" and insert -- second user --, therefor.

In column 11, line 26, in Claim 22, delete "specifics" and insert -- specifies --, therefor.

In column 11, line 30, in Claim 22, delete "delegated-right" and insert -- delegated-rights --, therefor.

In column 12, line 4, in Claim 23, delete "wherein" and insert -- wherein the --, therefor.

In column 12, line 11, in Claim 24, delete "a user" and insert -- an individual user --, therefor.

Signed and Sealed this
Twelfth Day of November, 2013

Teresa Stanek Rea
*Deputy Director of the United States Patent and Trademark Office*